US012780554B2

(12) United States Patent
Wu

(10) Patent No.: US 12,780,554 B2
(45) Date of Patent: Nov. 3, 2026

(54) SPIRAL MESH CHAIN CONVEYOR

(71) Applicant: YANGZHOU WELDON TRANSMISSION EQUIPMENT CO., LTD, Yangzhou (CN)

(72) Inventor: Baodong Wu, Yangzhou (CN)

(73) Assignee: YANGZHOU WELDON TRANSMISSION EQUIPMENT CO., LTD, Yangzhou (CN)

( * ) Notice: Subject to any disclaimer, the term of this patent is extended or adjusted under 35 U.S.C. 154(b) by 62 days.

(21) Appl. No.: 18/880,308

(22) PCT Filed: Feb. 1, 2023

(86) PCT No.: PCT/CN2023/074058

§ 371 (c)(1),
(2) Date: Dec. 31, 2024

(87) PCT Pub. No.: WO2024/093032

PCT Pub. Date: May 10, 2024

(65) Prior Publication Data

US 2025/0388406 A1 Dec. 25, 2025

(30) Foreign Application Priority Data

Nov. 2, 2022 (CN) ......................... 202211362316.6

(51) Int. Cl.
*B65G 15/48* (2006.01)
*B65G 23/06* (2006.01)
(Continued)

(52) U.S. Cl.
CPC ............. *B65G 15/48* (2013.01); *B65G 23/06* (2013.01); *B65G 15/02* (2013.01); *B65G 21/18* (2013.01)

(58) Field of Classification Search
CPC ........ B65G 15/48; B65G 33/24; B65G 15/02; B65G 21/18; B65G 35/00
(Continued)

(56) References Cited

U.S. PATENT DOCUMENTS

| | | | | |
|---|---|---|---|---|
| 4,852,720 A * | 8/1989 | Roinestad | ............. | B65G 23/34 198/833 |
| 4,901,844 A * | 2/1990 | Palmaer | ............... | B65G 17/086 198/852 |

(Continued)

FOREIGN PATENT DOCUMENTS

| | | |
|---|---|---|
| CN | 102971237 A | 3/2013 |
| CN | 107352231 A | 11/2017 |

(Continued)

*Primary Examiner* — Mark A Deuble
(74) *Attorney, Agent, or Firm* — Bayramoglu Law Offices LLC

(57) ABSTRACT

The provided is a spiral mesh chain conveyor, including a rotary drum and mesh chains, where the mesh chains enter a periphery of the rotary drum along a tangential direction and extend along a spiral line in a winding manner; a plurality of rotary drum upright posts and a plurality of driving vertical rods are uniformly arranged along a circumference of the rotary drum; an inner side of each link of the mesh chain close to the rotary drum is provided with a mesh chain guiding head; a guide member is sleeved on an outer wall of an inlet end of the rotary drum upright post; and a stroke increasing segment and a leading-in segment are sequentially provided on an outer wall of the guide member along a contact order of the mesh chain guiding head.

19 Claims, 17 Drawing Sheets

(51) Int. Cl.
*B65G 15/02* (2006.01)
*B65G 21/18* (2006.01)

(58) Field of Classification Search
USPC .......................................... 198/778, 848, 852
See application file for complete search history.

(56) References Cited

U.S. PATENT DOCUMENTS

| | | | | |
|---|---|---|---|---|
| 8,181,771 | B2 * | 5/2012 | Talsma .................. | B65G 21/18<br>198/852 |
| 9,884,723 | B2 * | 2/2018 | Neely .................... | B65G 21/18 |
| 10,947,048 | B2 * | 3/2021 | Elsner .................... | B65G 21/18 |
| 10,968,045 | B1 * | 4/2021 | Westcott ................ | B65G 33/34 |
| 11,053,081 | B2 * | 7/2021 | Perdue .................. | B65G 23/06 |
| 2015/0090560 | A1 | 4/2015 | Talsma et al. | |

FOREIGN PATENT DOCUMENTS

| | | | |
|---|---|---|---|
| CN | 111874518 | A | 11/2020 |
| CN | 114772173 | A | 7/2022 |
| CN | 114873163 | A | 8/2022 |
| CN | 115593869 | A | 1/2023 |
| JP | H10157819 | A | 6/1998 |
| WO | 2017019484 | A1 | 2/2017 |
| WO | 2021042452 | A1 | 3/2021 |

* cited by examiner

SPIRAL MESH CHAIN CONVEYOR

CROSS-REFERENCE TO THE RELATED APPLICATIONS

This application is the national phase entry of International Application No. PCT/CN2023/074058, filed on Feb. 1, 2023, which is based upon and claims priority to Chinese Patent Application No. 202211362316.6, filed on Nov. 2, 2022, the entire contents of which are incorporated herein by reference.

TECHNICAL FIELD

The present disclosure relates to a conveyor, in particular to a spiral mesh chain conveyor, and belongs to the technical field of conveyors.

BACKGROUND

A baked food production line bakes foods at a high temperature. The high-temperature foods taken out of an oven cannot be packaged immediately, but are cooled and conveyed for a long time. They must be cooled completely before packaged. The spiral mesh chain conveyor has been widely used in food baking industry due to its small footprint, long conveying distance, and long cooling time.

Existing spiral mesh chain conveyors include a rotary drum. Mesh chains are wound spirally at a periphery of the rotary drum and rotate synchronously with the rotary drum. A central shaft is provided at a center of the rotary drum. An upper end and a lower end of the central shaft are supported on a frame through a bearing seat. A plurality of rotary drum upright posts are uniformly arranged at the periphery of the rotary drum. Driving vertical rods are respectively fixed on the uniformly spaced rotary drum upright posts. An inner side of each link of the mesh chain close to the rotary drum is provided with a mesh chain guiding head engaged with the driving vertical rod. An inlet end of each driving vertical rod is provided with a guide member. The guide member is fixed on the rotary drum upright post.

Bottoms of the mesh chains on each layer are supported on a spiral ring rail to slide. Each layer of the spiral ring rail is fixed on radial support rods. Each radial support rod includes an outer end fixed on the mesh chain upright post. The mesh chain upright posts are uniformly distributed around an axis of the rotary drum.

The mesh chains enter from a linear segment to a spiral on the rotary drum through a fan-shaped transition segment. A ridge is provided on an outer wall of the guide member. The mesh chain guiding head is engaged with the ridge first, and then engaged with the driving vertical rod.

The existing spiral mesh chain conveyor has the following defects: 1. In an advancement direction of the mesh chains, when the front mesh chain guiding heads are engaged with the ridges, the rear mesh chain guiding heads only abut against the outer walls of the guide members, and are in a loosened state. Due to a tensile force of the linear segment, the mesh chains on the fan-shaped transition segment move back to the linear segment, and the mesh chains entering the spiral of the rotary drum are tensed. This cannot realize loose conveyance of the spiral.

2. When the mesh chains are tensed on the spiral tower, not only the wear of the mesh chains is accelerated to cause vibration of the device and displacement of the carried cargo, but also the mesh chains are broken easily to interrupt the production line or even damage the device. When the cargo on the mesh chains is displaced, accurate capture of the robot and stable operation of the production line are affected. This is a problem of the spiral mesh chain conveyor for a long time, and particularly affects the development of spiral conveyance toward more layers and heavier loads.

3. Pin shafts of the mesh chains are shifted from a mutual parallel state on the linear segment to a fan-shaped state in which an outer distance is greater than an inner distance. In this process, inner sides of the mesh chains get close to each other to adapt to the outer perimeter. In actual use, due to the heavy cargo on the mesh chains, after the inner sides of the mesh chains are adapted to the change of the outer perimeter, when the mesh chain driving head is completely engaged with the driving vertical rod, the inner side of the mesh chain and the rotary drum are driven actually by friction, and slide to each other. The inner side of the mesh chain moves back relative to the rotary drum. Due to a load before the mesh chain enters the rotary drum, the inner side and the outer side of the mesh chain are also driven to move back. In the loosened state of the mesh chains on the rotary drum, when the rotating mesh chain driving head is completely engaged with the ridge on the guide member, the mesh chain guiding head bears the accumulated load before the mesh chain enters the rotary drum. Consequently, the skip of the mesh chains is caused, and less mesh chains enter the spiral of the rotary drum.

4. In actual work, before the mesh chain guiding head is engaged with the corresponding driving vertical rod, an engagement clearance between an engaging surface of the mesh chain guiding head and an engaging surface of the corresponding driving vertical rod in a circumferential direction of the rotary drum is to be overcome. After the mesh chain guiding head is engaged with the corresponding driving vertical rod, the driving vertical rod drives the inner side of the mesh chain to advance a distance (overcome a loosened clearance), thereby driving the outer side of the mesh chain to advance. This realizes spiral rotary advancement of the driving vertical rod for driving the mesh chain. After the mesh chain moves back with desirable engagement, the outer side of the driven mesh chain is tensed. Due to hysteretic driving of the driving vertical rod, the power for rotating and advancing the mesh chain just entering the rotary drum relies on the drag of the front upper spiral mesh chain. Compared with the rotary drum and the outer side of the mesh chain, the inner side of the mesh chain with the mesh chain guiding head has a certain backward displacement all the times when entering the rotary drum. This is an important reason for the less advanced inner side and tensed outer side of the mesh chain. This problem is not solved by the prior art all of the time.

SUMMARY

An objective of the present disclosure is to provide a spiral mesh chain conveyor, to overcome the problem in the prior art. When the mesh chains enters the rotary drum, the present disclosure can prevent the tensile force of the linear segment from pulling the mesh chains on the fan-shaped transition segment back, thereby keeping the mesh chains on the spiral tower in a loose state.

To solve the above-mentioned technical problems, the present disclosure provides a spiral mesh chain conveyor, including a rotary drum and mesh chains, where the mesh chains enter a periphery of the rotary drum along a linear segment and extend along a spiral line in a winding manner; a plurality of driving vertical rods are uniformly arranged at the periphery of the rotary drum; an inner side of each link of the mesh chain close to the rotary drum is provided with a mesh chain guiding head engaged with the driving vertical rod; an inlet end of the driving vertical rod is provided with a guide member; a stroke increasing segment and a leading-in segment are sequentially provided on an outer wall of the guide member along a contact order of the mesh chain guiding head; a tail end of the leading-in segment inclines to an outer wall of the rotary drum; the guide member is provided with a strip ridge along an outer wall of the stroke increasing segment and an outer wall of the leading-in segment; a tail end of the strip ridge is docked with the inlet end of the driving vertical rod; and when the front mesh chain guiding head is engaged with the strip ridges, the rear mesh chain guiding head is limited on the outer wall of the rotary drum and bears a tensile force of the linear segment at the rear of the rear mesh chain guiding heads.

Further, a plurality of vertical grooves for allowing the mesh chain guiding head to be embedded into are formed in an outer wall of an inlet end of the guide member along a width direction.

Further, a tail end of the vertical groove and an inlet end of the strip ridge are spaced apart by a distance or flush with each other, or the tail end of the vertical groove extends into the outer wall of the stroke increasing segment.

Further, the inlet end of the guide member is further provided with a columnar segment; and the vertical groove is located on an outer wall of the columnar segment.

Further, an inlet oblique segment is provided between the columnar segment and the stroke increasing segment; and an inlet end of the strip ridge extends to a slope of the inlet oblique segment and intersects with the slope of the inlet oblique segment.

Further, the stroke increasing segment and the leading-in segment are located on a same oblique surface or on two oblique surfaces having different inclinations; and a length direction of the strip ridge is parallel to an oblique surface where the strip ridge is located or parallel to a bottom edge of the guide member.

Further, the strip ridge has a circular cross section; a bottom of the circular cross section is connected to the guide member integrally; and a concave arc of an engaging surface of the mesh chain guiding head is hooked to a convex arc of a side of the strip ridge.

Further, a ridge overhead hook is provided on a sidewall of the strip ridge; a mesh chain overhead hook is provided on a sidewall of the mesh chain guiding head; and the mesh chain overhead hook and the ridge overhead hook are embedded into each other.

Further, a cross section of the strip ridge is a square or a T shape that is wide outside and narrow inside.

Further, one, two or more ridge buckling grooves are formed in a sidewall of the strip ridge; one, two or more mesh chain buckling grooves are formed in a sidewall of the mesh chain guiding head; and the ridge buckling groove and the mesh chain buckling groove are embedded into each other.

Further, the ridge buckling groove or the mesh chain buckling groove is a rectangle, a triangle, a trapezoid or a semicircle.

Further, the strip ridge extends to a middle of the stroke increasing segment from the leading-in segment; a plurality of vertical grooves for allowing the mesh chain guiding head to be embedded into are formed in an outer wall of an inlet end of the guide member along a width direction; and the vertical groove extends to an inlet end of the strip ridge or exceeds the inlet end of the strip ridge.

Further, when the mesh chain is overloaded, the mesh chain guiding head is popped out from the original engaged vertical groove and slides into the downstream vertical groove.

Further, a top of the strip ridge is convex arc-shaped; an inclined ridge chamfer is provided at an inlet end of the strip ridge; and a surface of the ridge chamfer contacting the mesh chain guiding head is arc-shaped.

Further, a mesh chain chamfer is provided on a mesh chain engaging tooth close to the mesh chain guiding head.

Further, limit members are uniformly arranged on a circumference of an inlet end of the rotary drum; a plurality of vertical grooves for allowing the mesh chain guiding head to be embedded into are formed in an outer wall of the limit member along a width direction; and the limit member and the guide member are arranged alternately at the periphery of the rotary drum.

Further, the vertical groove is a concave arc-shaped groove, a V-shaped groove, a trapezoidal groove or a square groove.

Further, the inner side of each link of the mesh chain is provided with a link driving end extending to the outer wall of the rotary drum; the mesh chain guiding head is located at a head of the link driving end; a heightening ridge connected to the strip ridge integrally is provided at a top of the strip ridge; and when the strip ridge is engaged with the mesh chain guiding head, the heightening ridge on the strip ridge is also engaged with the corresponding link driving end.

Further, there is an arc length difference L between an arc length of a spiral line wound by an inner side of the mesh chain on the stroke increasing segment and the leading-in segment, and an arc length of a spiral line wound by the inner side of the mesh chain along the driving vertical rod at a same phase angle; a distance between an engaging surface of the mesh chain guiding head at an inlet of the stroke increasing segment and an engaging surface of the driving vertical rod in a circumferential direction of the rotary drum is defined as an engagement clearance D1; after engaged with the mesh chain guiding head, the driving vertical rod drives the inner side of the mesh chain to advance a distance to overcome a loosened clearance D2, thereby driving an outer side of the mesh chain to advance; and the arc length difference L≥the engagement clearance D1+the loosened clearance D2.

Compared with the prior art, the present disclosure achieves the following beneficial effects: 1. When the mesh chain guiding head entering the engagement spiral is engaged with the strip ridge, a plurality of mesh chain guiding heads on the fan-shaped transition segment are embedded into the corresponding vertical grooves to bear the tensile force of the rear linear segment. This prevents the mesh chains on the fan-shaped transition segment from moving back, and prevents the mesh chains on the spiral tower from being tensed.

2. The guide member includes the stroke increasing segment being a plane, and the leading-in segment being a gradually narrowed oblique surface. The arc length difference generated by the axial length of the stroke increasing segment and the thickness of the stroke increasing segment is used to make up the engagement clearance and the loosened clearance when the driving vertical rod is engaged with the mesh chain guiding head. After the mesh chain guiding head is engaged with the driving vertical rod, the outer side of the mesh chain advances immediately and synchronously with the rotary drum. Therefore, a spiral surface formed by the mesh chains wound at the periphery of the rotary drum is in a loose state, and is not tensed.

3. The strip ridge on the axis of the stroke increasing segment and the axis of the leading-in segment serves to limit the mesh chain guiding head. This prevents the mesh chain guiding heads at a front side of a rotating direction of the strip ridge from moving back for reasons such as the tensile force of the linear segment, thereby preventing an accumulated error. The mesh chain guiding heads can be adjusted on a smooth outer wall of the inlet end of the stroke increasing segment not provided with the strip ridge and the vertical groove to get close to each other.

4. When the guide member is only provided with the stroke increasing segment and the leading-in segment, the stroke increasing segment has a long axial length, and a small raised height in a radius direction of the rotary drum, and the radius for the outer side of the mesh chain at the guide member is less increased.

5. When the guide member is provided with the columnar segment, the inlet oblique segment, the stroke increasing segment, and the leading-in segment, the stroke increasing effect is relatively strong, and this is applied to a condition in which both the engagement clearance and the loosened clearance are relatively large.

6. The ridge on the stroke increasing segment is engaged with the concave arc of the engaging surface of the mesh chain guiding head. The concave arc of the engaging surface of the sidewall of the mesh chain guiding head is hooked to the convex arc of the side of the strip ridge. This can effectively prevent the mesh chain guiding head from skipping from the ridge when the mesh chain guiding head bears the accumulated load before the mesh chain enters the rotary drum.

BRIEF DESCRIPTION OF THE DRAWINGS

The present disclosure is described in further detail below with reference to the drawings and specific implementations. The drawings are provided for reference and illustration only, and are not intended to limit the present disclosure.

In the figures: 1: rotary drum, 1*a*: central shaft, 1*b*: driving vertical rod, 1*c*: rotary drum upright post, 2: mesh chain, 2*a*: mesh chain guiding head, 2*b*: linear segment, 2*c*: fan-shaped transition segment, 2*d*: engagement spiral, 2*e*: link driving end, 2*f*: mesh chain chamfer, 3: guide member, 3*a*: columnar segment, 3*b*: inlet oblique segment, 3*c*: stroke increasing segment, 3*d*: leading-in segment, 3*e*: strip ridge, 3*e*1: ridge overhead hook, 3*e*2: ridge buckling groove, 3*f*: vertical groove, 3*g*: heightening ridge, 4: limit member, 4*a*: vertical groove, and 5: frame.

DETAILED DESCRIPTION OF THE EMBODIMENTS

In the description of the present disclosure, the terms such as "upper", "lower", "front", "back", "left", "right", "inner" and "outer" are intended to indicate orientations or positions based on the drawings. It should be noted that these terms are merely intended to facilitate and simplify the description of the present disclosure, rather than to indicate or imply that the mentioned device must have the specific orientation. The present disclosure takes the lifting spiral as an example.

Figure 1:
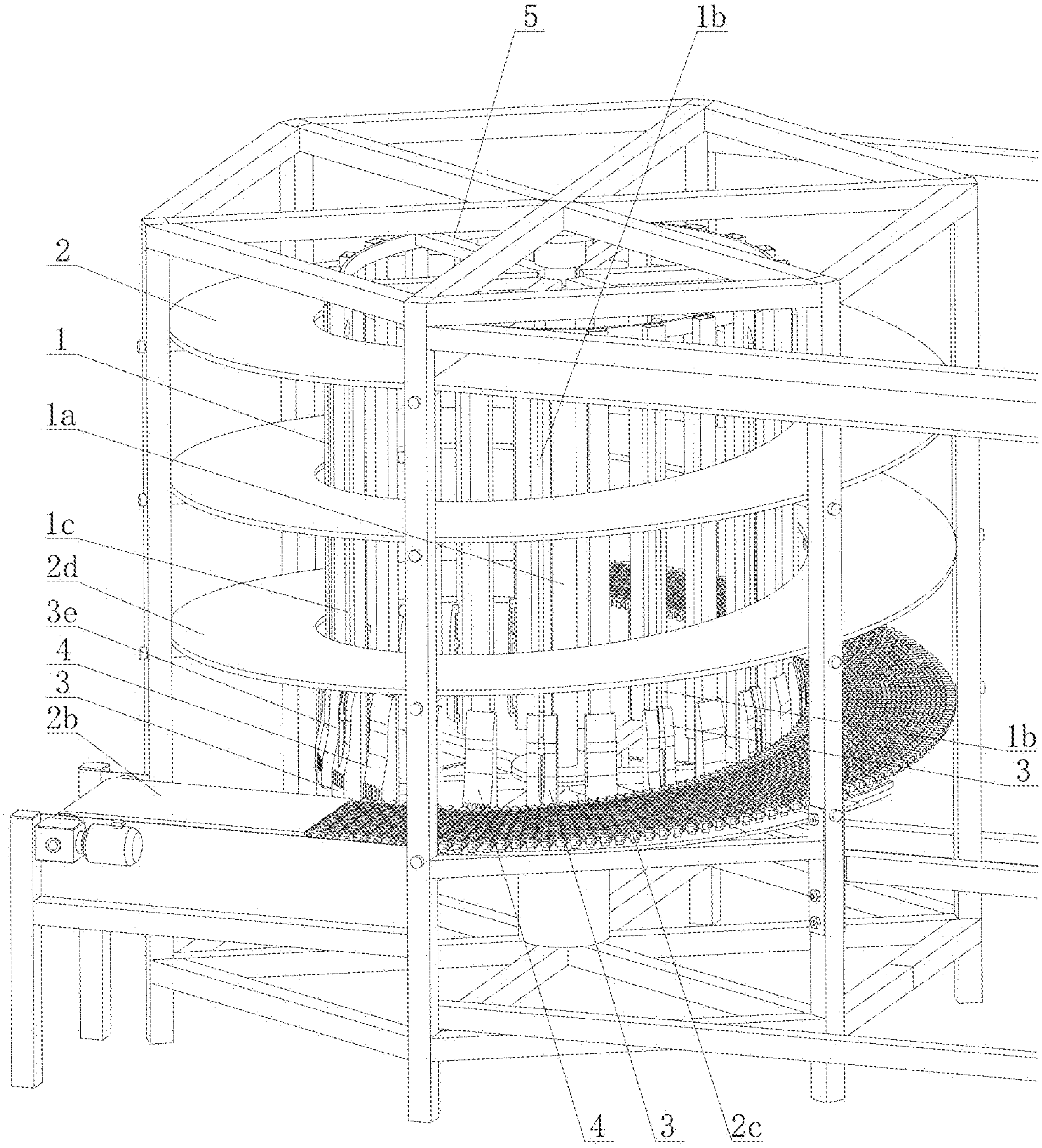
FIG. 1 is a perspective view of a spiral mesh chain conveyor according to the present disclosure.
Figure 2:
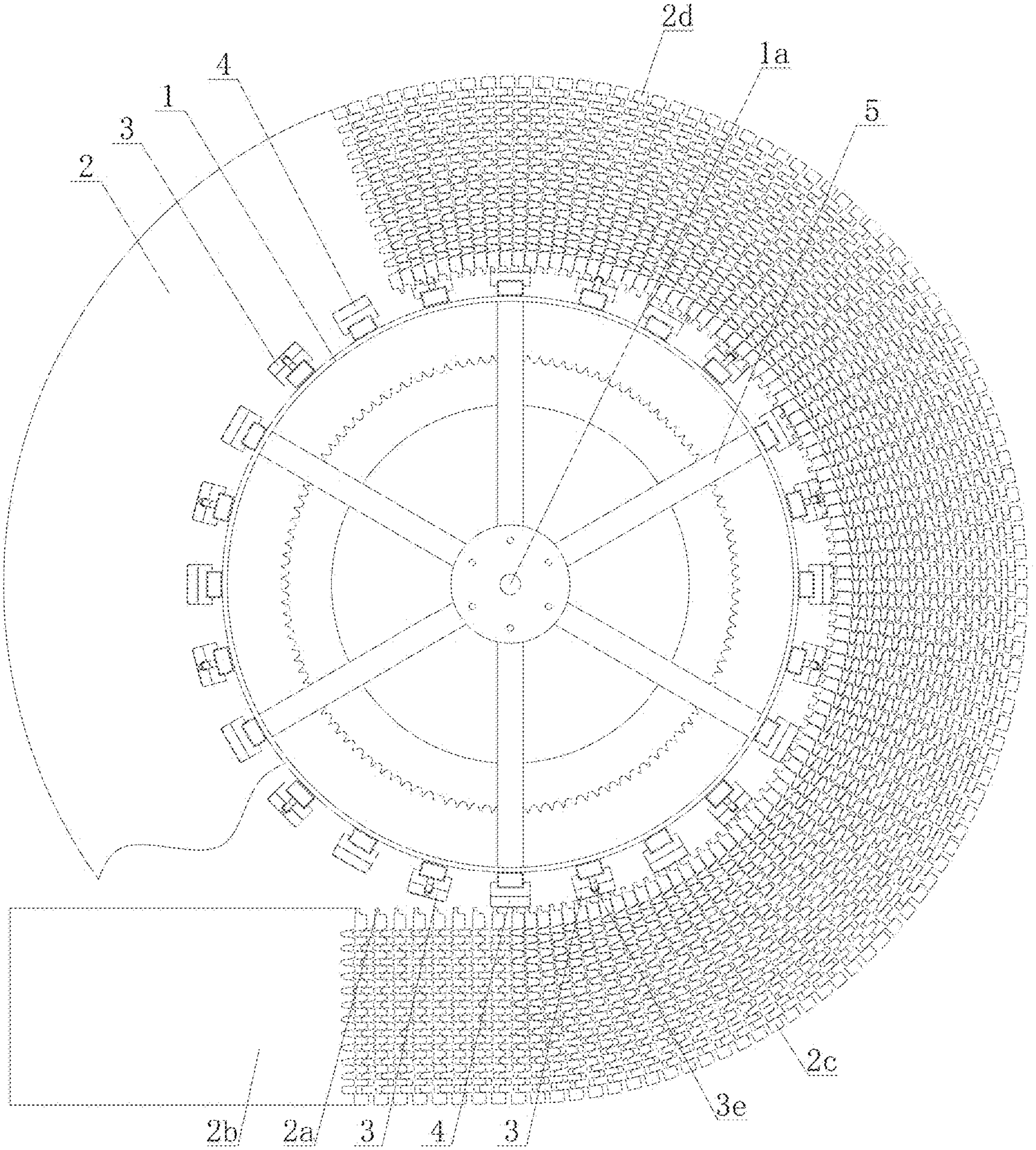
FIG. 2 is a top view of a spiral mesh chain conveyor according to the present disclosure.

As shown in FIG. 1 and FIG. 2, the present disclosure provides a spiral mesh chain conveyor, including rotary drum 1 and mesh chains 2. The mesh chains 2 enter a periphery of the rotary drum 1 along linear segment 2*b*, namely a tangential direction of the rotary drum 1, enter engagement spiral 2*d* through fan-shaped transition segment 2*c*, and extend along a spiral line in a winding manner. The mesh chains 2 rotate synchronously with the rotary drum. Central shaft 1*a* is provided at a center of the rotary drum. An upper and a lower end of the central shaft 1*a* are supported on frame 5 through a bearing seat. A plurality of rotary drum upright posts 1*c* are uniformly arranged at the periphery of the rotary drum 1. Driving vertical rods 1*b* are respectively provided on outer walls of all or some of the uniformly spaced rotary drum upright posts 1*c*. An inner side of each link of the mesh chain 2 close to the rotary drum is provided with mesh chain guiding head 2*a* engaged with the driving vertical rod 1*b*. Guide member 3 is sleeved on an outer wall of an inlet end of the rotary drum upright post 1*c*. That is, a plurality of guide members 3 are uniformly provided on an outer wall of a lower end of the rotary drum upright post with the ascending spiral or an outer wall of an upper end of the rotary drum upright post with the descending spiral.

Figure 3:
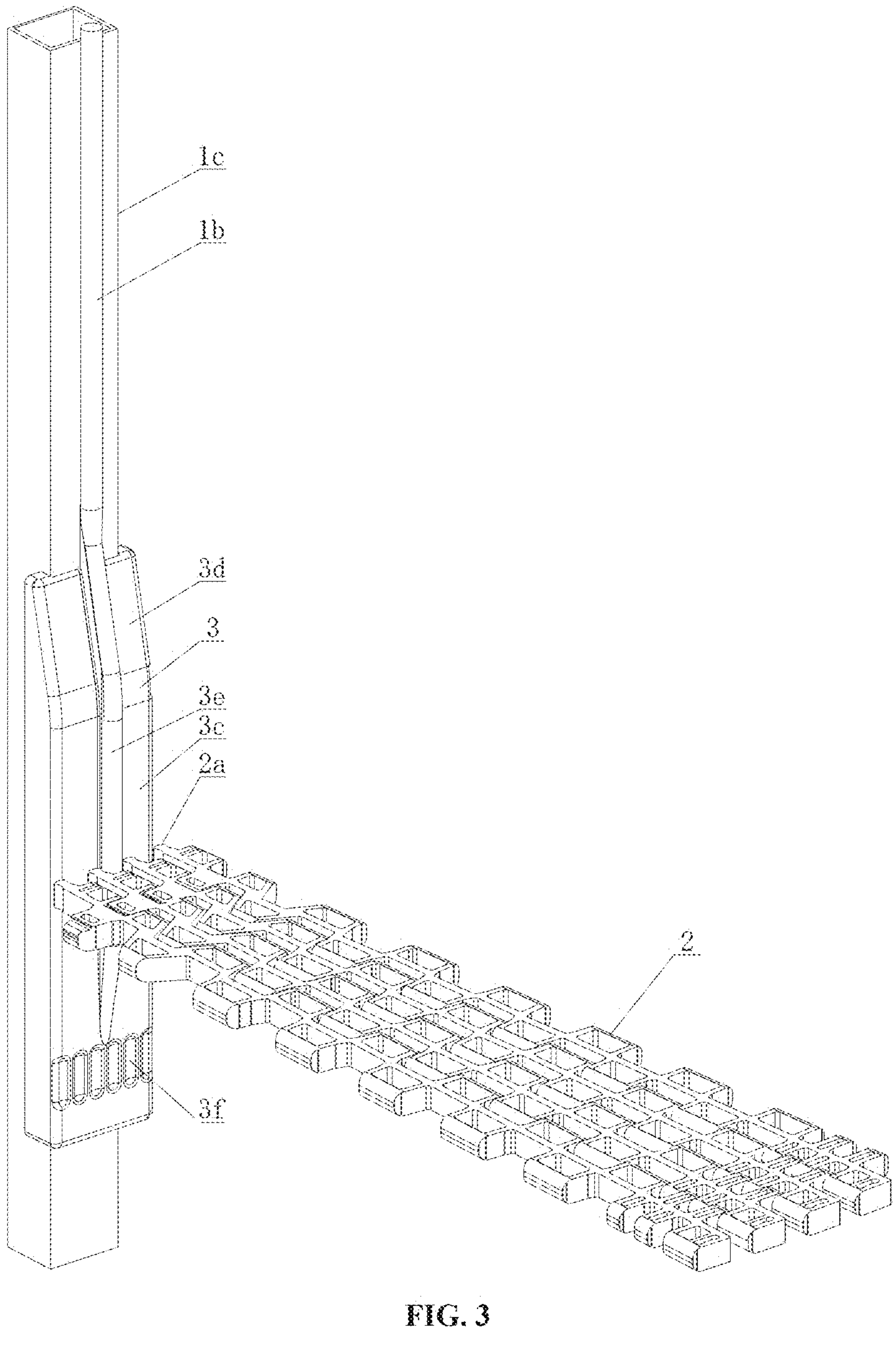
FIG. 3 illustrates a working state of a guide member according to Embodiment 1 of the present disclosure.

FIG. 3 illustrates the guide member according to Embodiment 1. Stroke increasing segment 3*c* and leading-in segment 3*d* are sequentially provided on an outer wall of the guide member 3 along a contact order of the mesh chain guiding head 2*a*. The stroke increasing segment 3*c* includes an outer wall being a plane and two transverse sides each provided with an arc chamfer. The leading-in segment 3*d* inclines to an outer wall of the rotary drum upright post 1*c*.

The guide member 3 is provided with raised strip ridge 3*e* along an axis of the outer wall of the stroke increasing segment 3*c* and an axis of an outer wall of the leading-in segment 3*d*. The strip ridge 3*e* has a circular cross section. A bottom of the circular cross section is connected to the guide member 3 integrally. That is, most of a circumference of the circular ridge is exposed on the outer wall of the guide member 3. A root of the circular ridge bonded with the guide member 3 is relatively narrow. A concave arc of an engaging surface of a side of the mesh chain guiding head 2*a* is hooked to a convex arc of a side of the strip ridge 3*e*. An outer edge of a tail end of the strip ridge 3*e* is flush with an outer edge of an inlet end of the driving vertical rod 1*b*, thereby realizing smooth docking. The strip ridge 3*e* may serve to prevent the mesh chain guiding heads 2*a* at a front side of the strip ridge from moving back, and prevent the inner sides of the mesh chains 2 from moving back for a tensile force of the linear segment 2*b*. Through strip ridge 3*e*, the mesh chain guiding head 2*a* may further be engaged with the driving vertical rod 1*b* more smoothly.

When the mesh chain guiding head 2*a* at a most front end of the fan-shaped transition segment 2*c* is engaged with the strip ridge 3*e*, namely the mesh chain guiding head enters the engagement spiral 2*d*, after the engagement spiral 2*d* advances a certain angle along the spiral line, the mesh chain guiding head 2*a* is engaged with the driving vertical rod 1*b*, and the mesh chain 2 is driven by the driving vertical rod 1*b* to advance continuously along the spiral line. The mesh chain guiding head 2*a* not engaged with the strip ridge 3*e* on the fan-shaped transition segment 2*c* is limited on the outer wall of the rotary drum and bears a tensile force of the rear linear segment 2*b*, so as to prevent the mesh chain on the fan-shaped transition segment 2*c* from moving back, and prevent the mesh chain 2 from being tensed on a spiral tower.

A plurality of vertical grooves 3*f* for allowing the mesh chain guiding head 2*a* to be embedded into are formed in an outer wall of an inlet end of the guide member along a width direction. The vertical grooves 3*f* are concave arc-shaped grooves. On the fan-shaped transition segment 2*c*, a plurality of mesh chain guiding heads 2*a* are embedded into corresponding vertical grooves 3*f* to jointly bear the tensile force of the linear segment 2*b*.

A tail end of the vertical groove 3*f* and an inlet end of the strip ridge 3*e* are flush with each other. The tail end of the vertical groove 3*f* may further extend into the outer wall of the stroke increasing segment 3*c*.

Since a radius of a circumference where the stroke increasing segment 3*c* is located is greater than a radius of a circumference where the driving vertical rod 1*b* is located, there is a radius difference to cause an arc length difference in response to a same central angle of the inner side of the mesh chain. When the mesh chain 2 transitioned through the leading-in segment 3*d* from the stroke increasing segment 3*c* is engaged with the driving vertical rod 1*b*, the arc length difference can counteract an engagement clearance and a loosened clearance in the past. The driving vertical rod 1*b* is engaged with the mesh chain guiding head 2*a* desirably and immediately, such that the driving vertical rod 1*b* can drive the inner side of the mesh chain normally for advancement. This prevents the reliance on the drag of the front mesh chain, and prevents the inner side of the mesh chain from moving back.

From a circumferential direction, there is a distance between an engaging surface of the mesh chain guiding head at an inlet of the stroke increasing segment 3*c* and an engaging surface of the driving vertical rod in a circumferential direction of the rotary drum. The distance is defined as the engagement clearance D1. After the mesh chain guiding head 2*a* is engaged with the corresponding driving vertical rod 1*b*, the driving vertical rod 1*b* drives the inner side of the mesh chain to advance a distance, thereby driving an outer side of the mesh chain to advance. The distance is defined as the loosened clearance D2.

When the mesh chain guiding head 2*a* starts to enter the stroke increasing segment 3*c* of the guide member 3, until it is separated from the leading-in segment 3*d* of the guide member 3, a central angle rotated by the guide member 3 around an axis of the rotary drum is defined as a stroke increasing phase angle. There is an arc length difference between an arc length of a spiral line corresponding to the stroke increasing phase angle and wound by the inner side of the mesh chain on the stroke increasing segment 3*c* and the leading-in segment 3*d*, and an arc length of a spiral line wound by the inner side of the mesh chain at the same phase angle along the rotary drum upright post 1*c*. The arc length difference is defined as arc length difference L, the arc length difference L≥the engagement clearance D1+the loosened clearance D2.

The greater a ratio of L/(D1+D2), the looser the outer sides of the mesh chain, thereby realizing loose conveyance and a stronger carrying capacity to ensure that the driving vertical rod 1*b* timely drives the mesh chain guiding heads 2*a* for advancement. This can prevent an accumulated error caused by the loosened clearance, and also prevent the mesh chains from being tensed for hysteresis or less advancement of the inner sides of the mesh chains.

In two-tower application, ratios of L/(D1+D2) of the two towers may also be not the same, so as to reduce a tensile force of a transition segment between the two towers.

Figure 4:
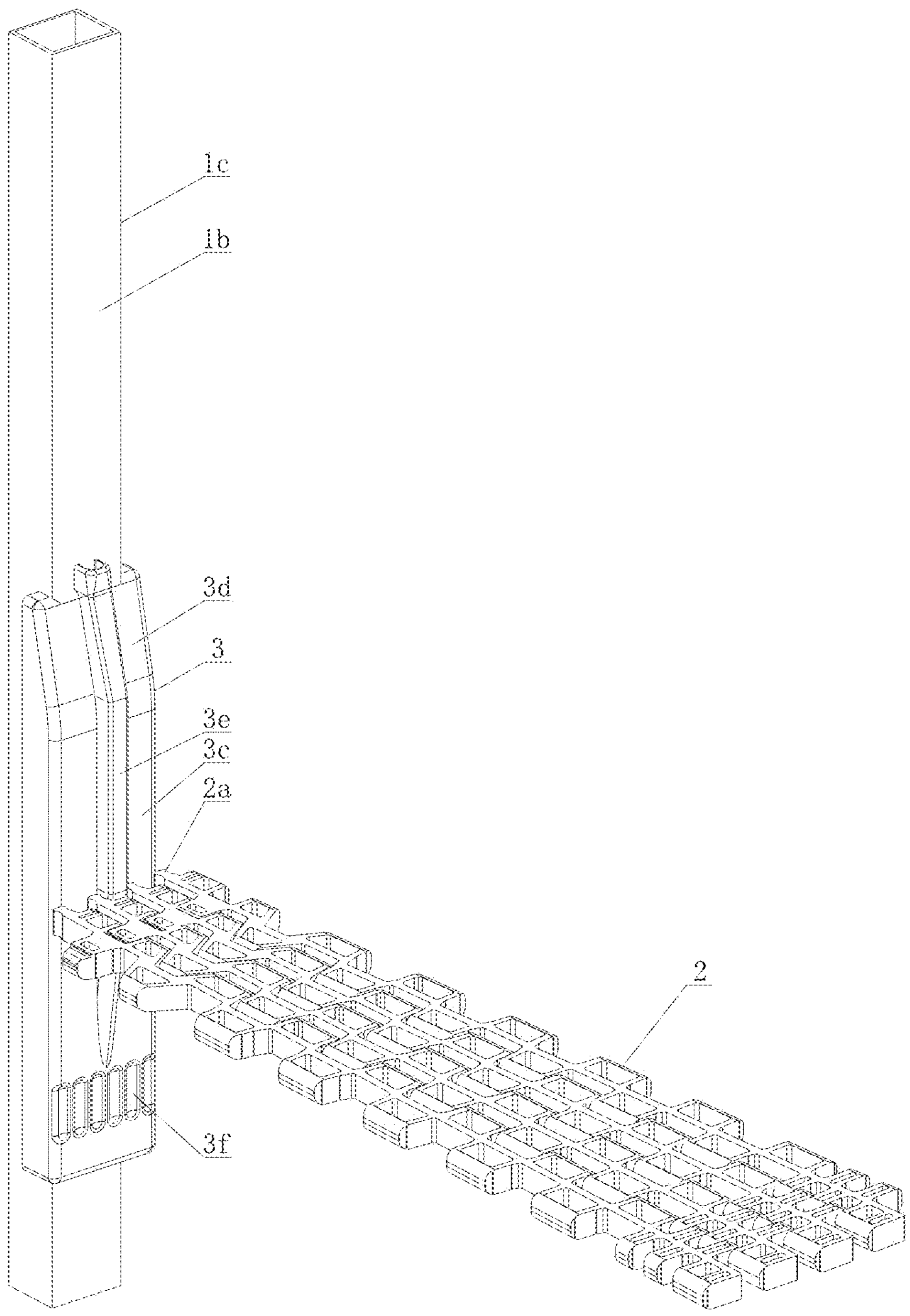
FIG. 4 illustrates a working state of a guide member according to Embodiment 2 of the present disclosure.

FIG. 4 illustrates the guide member according to Embodiment 2. The strip ridge 3*e* has a square cross section. Two sides of the strip ridge 3*e* are a plane, and in transition with a top of the ridge through an arc angle. Other contents are the same as those in Embodiments. The vertical grooves 3*f* are located at the inlet end of the guide member 3.

Figure 5:
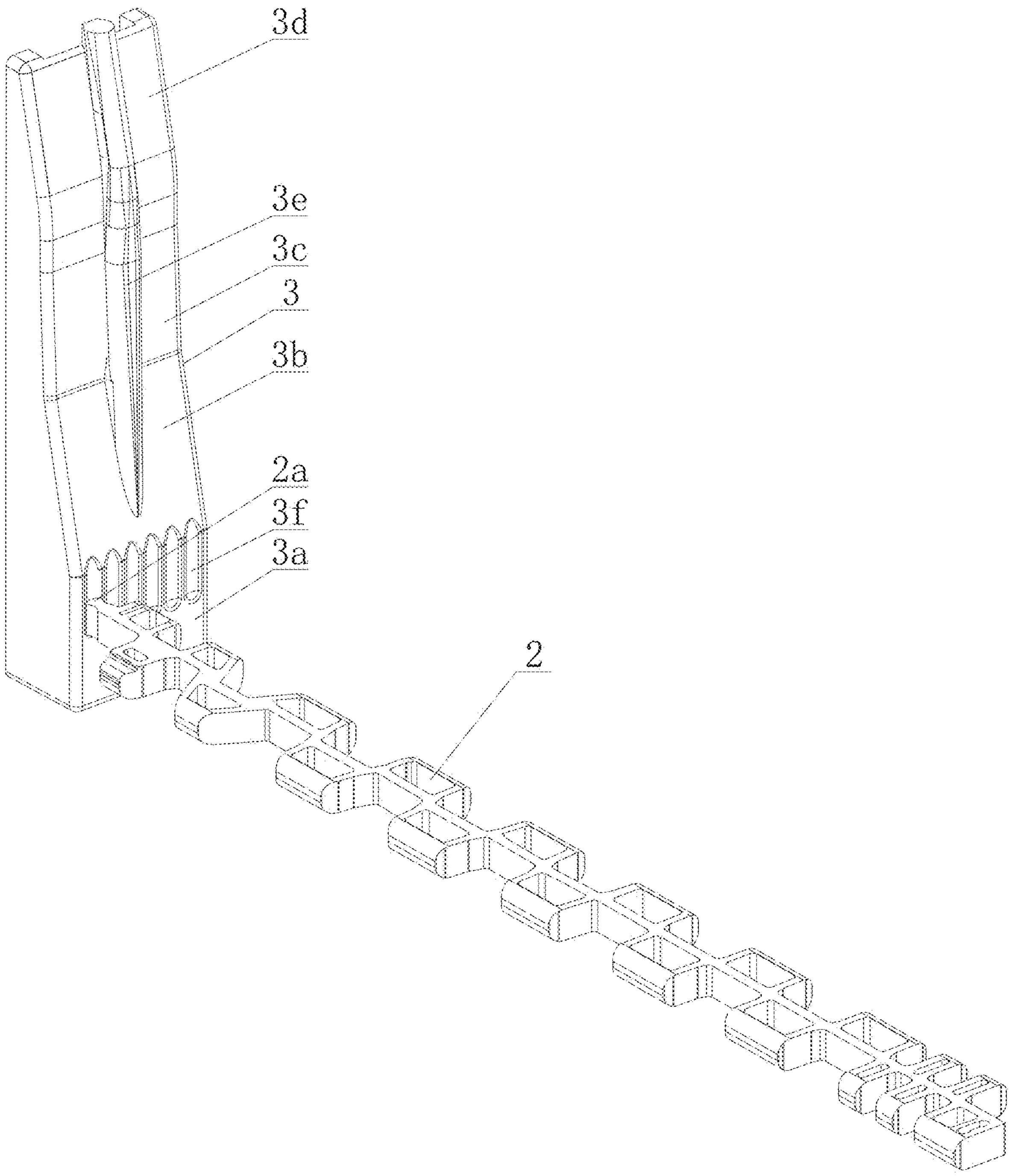
FIG. 5 illustrates a first working state of a guide member according to Embodiment 3 of the present disclosure.

FIG. 5 illustrates the guide member according to Embodiment 3. Columnar segment 3*a*, inlet oblique segment 3*b*, stroke increasing segment 3*c*, and leading-in segment 3*d* are sequentially provided on the outer wall of the guide member 3 along a contact order of the mesh chain guiding head 2*a*. Raised strip ridge 3*e* is provided along an axis of an outer wall of the inlet oblique segment 3*b*, an axis of an outer wall of the stroke increasing segment 3*c*, and an axis of an outer wall of the leading-in segment 3*d*.

The stroke increasing segment 3*c* and the leading-in segment 3*d* are respectively located on two oblique surfaces having different inclinations. A length direction of the strip ridge 3*e* on the stroke increasing segment 3*c* is parallel to the outer wall of the stroke increasing segment 3*c*. An inlet end of the strip ridge 3*e* extends to a slope of the inlet oblique segment 3*b* and intersects with the slope of the inlet oblique segment. A length direction of the strip ridge 3*e* on the leading-in segment 3*d* is parallel to the outer wall of the leading-in segment 3*d*. A radius of the strip ridge on the leading-in segment 3*d* is less than a radius of the strip ridge on the stroke increasing segment 3*c*. The strip ridge on the leading-in segment and the strip ridge on the stroke increasing segment are in smooth transition.

The stroke increasing segment 3*c* may further be parallel to a bottom edge of the guide member 3. An axis of the strip ridge 3*e* on the stroke increasing segment 3*c* is parallel to the bottom edge of the guide member 3.

A plurality of vertical grooves 3*f* are uniformly formed in a width direction of the columnar segment 3*a*. The vertical groove 3*f* is a concave arc-shaped groove. A tail end of the vertical groove 3*f* is spaced apart from the inlet end of the strip ridge 3*e* by a distance.

A vertical strip rib is provided between two adjacent vertical grooves 3*f*. The inlet end of the strip ridge 3*e* is flush with the middle vertical strip rib.

Figure 6:
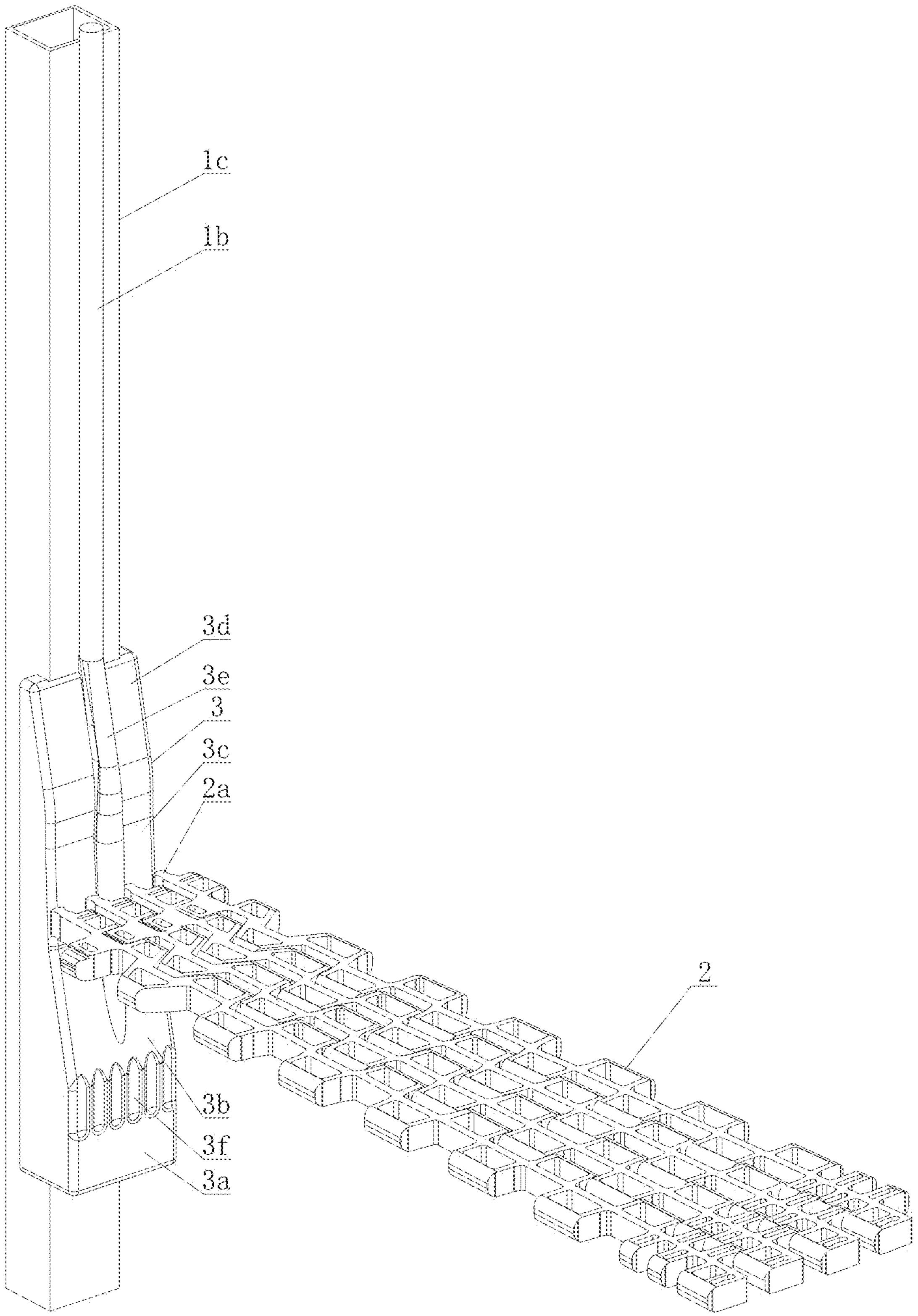
FIG. 6 illustrates a second working state of a guide member according to Embodiment 3 of the present disclosure.

The mesh chain guiding head 2*a* contacts a smooth surface of the columnar segment 3*a* first. As the mesh chain winds up, at least one of the mesh chain guiding heads 2*a* is embedded into the vertical groove 3*f*, and hooked with the vertical groove, as shown in FIG. 5. As the mesh chain 2 winds up, the mesh chain guiding head 2*a* is hooked by the strip ridge 3*e*, as shown in FIG. 6.

A distance between the outer wall of the stroke increasing segment and the axis of the rotary drum is greater than a distance between the outer wall of the rotary drum upright post and the axis of the rotary drum. When a larger stroke is to be increased, the distance between the outer wall of the stroke increasing segment and the axis of the rotary drum may be greater than a distance between an outer edge of the driving vertical rod and the axis of the rotary drum. A distance between the outer wall of the columnar segment and the axis of the rotary drum is greater than the distance between the outer wall of the stroke increasing segment and the axis of the rotary drum. The inlet oblique segment 3*b* serves as a transition oblique surface between the columnar segment 3*a* and the stroke increasing segment 3*c*. The leading-in segment 3*d* serves as a transition oblique surface between the stroke increasing segment 3*c* and the inlet end of the driving vertical rod 1*b*.

Inner sides of mesh chains may abut against the columnar segment 3*a* of the guide member 3 to rotate to the rotary drum, and get close to each other. The inner sides of the mesh chains are transitioned by the inlet oblique segment 3*b* to enter the stroke increasing segment 3*c*. A circumference where the columnar segment 3*a* of the guide member 3 is located is greater than a circumference where the stroke increasing segment 3*c* is located by a certain radius, such that the mesh chains 2 are looser when reaching the stroke increasing segment 3*c* from the columnar segment 3*a*.

From a top direction, there is a distance between an engaging surface of the mesh chain guiding head on the inlet oblique segment 3*b* and an engaging surface of the driving vertical rod in a circumferential direction of the rotary drum. The distance is defined as engagement clearance D1. After the mesh chain guiding head 2*a* is engaged with the corresponding driving vertical rod, the driving vertical rod drives the inner side of the mesh chain to advance a distance, thereby driving an outer side of the mesh chain to advance. The distance is defined as loosened clearance D2.

When the mesh chain guiding head 2*a* starts to enter the inlet oblique segment 3*b* of the guide member 3, until it is separated from the leading-in segment 3*d* of the guide member 3, a central angle rotated by the guide member 3 around an axis of the rotary drum is defined as a stroke increasing phase angle. There is an are length difference between an arc length of a spiral line corresponding to the stroke increasing phase angle and wound by the inner side of the mesh chain on the inlet oblique segment 3*b*, the stroke increasing segment 3*c* and the leading-in segment 3*d*, and an arc length of a spiral line wound by the inner side of the mesh chain at the same phase angle along the rotary drum upright post 1*c*. The arc length difference is defined as are length difference L. The arc length difference L in the embodiment includes arc length difference L1 caused by the inlet oblique segment 3*b*, arc length difference L2 caused by the stroke increasing segment 3*c*, and arc length difference L3 caused by the leading-in segment 3*d*.

The guide member is provided with the raised strip ridge 3*e* along the axis of the outer wall of the inlet oblique segment 3*b* to the axis of the outer wall of the leading-in segment 3*d*. The raised strip ridge 3*e* includes one end flush with the columnar segment 3*a* of the guide member, and the other end smoothly docked with the inlet end of the driving vertical rod 1*b*.

A difference between the distance between the outer wall of the stroke increasing segment and the axis of the rotary drum, and a radius of the rotary drum is the same as a thickness of the stroke increasing segment. The radius of the rotary drum is the distance between the outer wall of the rotary drum upright post 1*c* and the axis of the rotary drum. Due to the arc length difference generated by an axial length of the rotary drum and the thickness of the rotary drum, the mesh chain guiding head 2*a* can be engaged smoothly when reaching the driving vertical rod.

A width of the guide member 3 relative to a perimeter of the rotary drum is very small. The columnar segment 3*a* and the stroke increasing segment 3*c* of the guide member 3 may be a cylindrical arc-shaped surface with the axis of the rotary drum as a center, and may also be a plane approximately. The inlet oblique segment 3*b* and the leading-in segment 3*d* of the guide member 3 may also be a conical surface with the axis of the rotary drum as a center, and may also be an oblique surface approximately, so as to simplify the machining.

Figure 7:
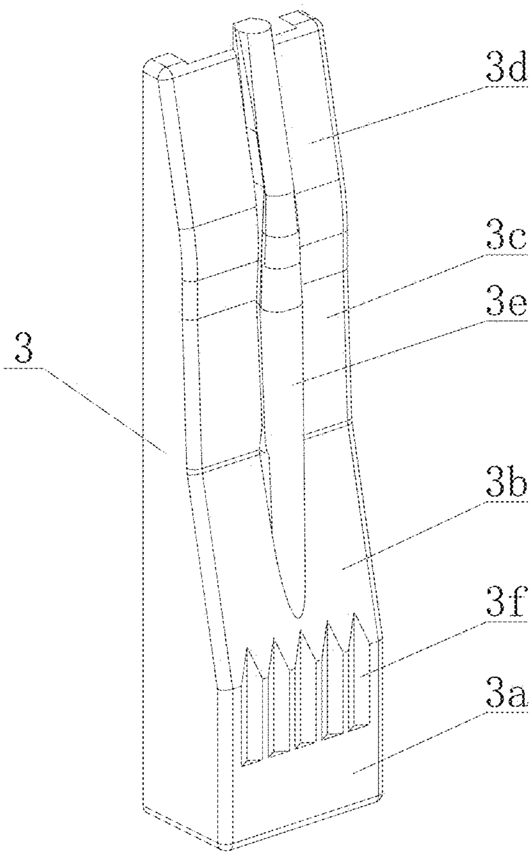
FIG. 7 is a perspective view of a guide member according to Embodiment 4 of the present disclosure.

FIG. 7 illustrates the guide member according to Embodiment 4. The vertical groove 3*f* is a V-shaped groove, and is formed at the tail end of the columnar segment 3*a*. Other contents are the same as those in Embodiment 3. The strip ridge 3*e* has a circular cross section. A bottom of the circular cross section is connected to the guide member 3 integrally.

Figure 8:
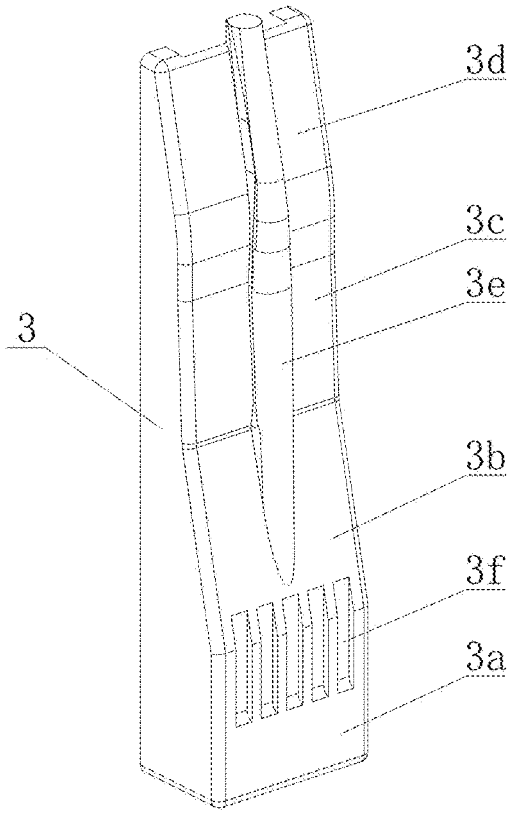
FIG. 8 is a perspective view of a guide member according to Embodiment 5 of the present disclosure.

FIG. 8 illustrates the guide member according to Embodiment 5. The vertical groove 3*f* is a square groove, and is formed at the tail end of the columnar segment 3*a*. Other contents are the same as those in Embodiment 3.

Figure 9:
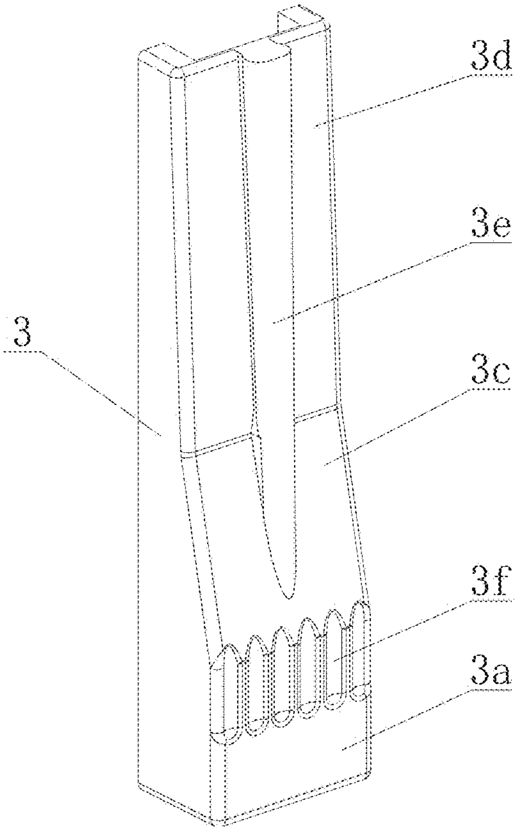
FIG. 9 is a perspective view of a guide member according to Embodiment 6 of the present disclosure.

FIG. 9 illustrates the guide member according to Embodiment 6. Columnar segment 3*a*, stroke increasing segment 3*c*, and leading-in segment 3*d* are sequentially provided on the outer wall of the guide member 3 along a contact order of the mesh chain guiding head 2*a*. A plurality of vertical grooves 3*f* are uniformly formed in a width direction of the columnar segment 3*a*. The vertical groove 3*f* is a concave arc-shaped groove. Raised strip ridge 3*e* is provided along an axis of an outer wall of the stroke increasing segment 3*c* and an axis of an outer wall of the leading-in segment 3*d*. The strip ridge 3*e* includes a top being a plane, two sides each being a circular arc, and a root bonded with the guide member 3 being narrowed. The stroke increasing segment 3*c* and the leading-in segment 3*d* are respectively located on different oblique surfaces. The stroke increasing segment 3*c* is relatively steep, while the leading-in segment 3*d* is relatively flat. An axis of the strip ridge 3*e* is parallel to the outer wall of the leading-in segment 3*d*, extends to the stroke increasing segment 3*c*, and intersects with the stroke increasing segment.

Figure 10:
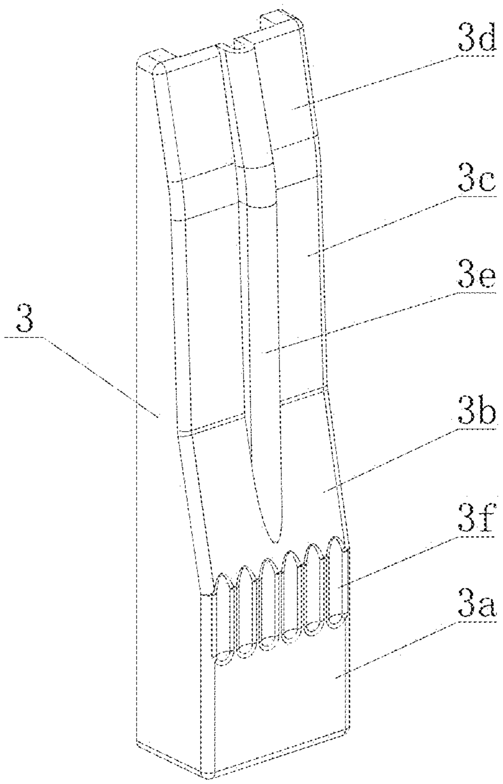
FIG. 10 is a perspective view of a guide member according to Embodiment 7 of the present disclosure.

FIG. 10 illustrates the guide member according to Embodiment 7. The vertical groove 3*f* is a concave arc-shaped groove, and is formed at the tail end of the columnar segment 3*a*. The strip ridge 3*e* includes a top being a circular arc, and two sides being a plane tangential to a top of the circular arc. Bottoms of the two sides of the strip ridge are connected to the guide member 3 integrally. Other contents are the same as those in Embodiment 3.

Figure 11:
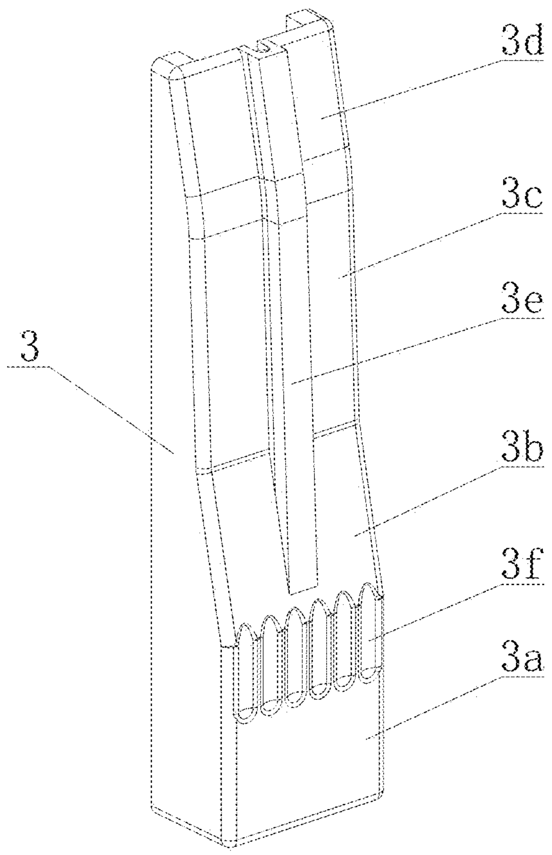
FIG. 11 is a perspective view of a guide member according to Embodiment 8 of the present disclosure.

FIG. 11 illustrates the guide member according to Embodiment 8. The strip ridge 3*e* has a square section. Other contents are the same as those in Embodiment 7.

Figure 12:
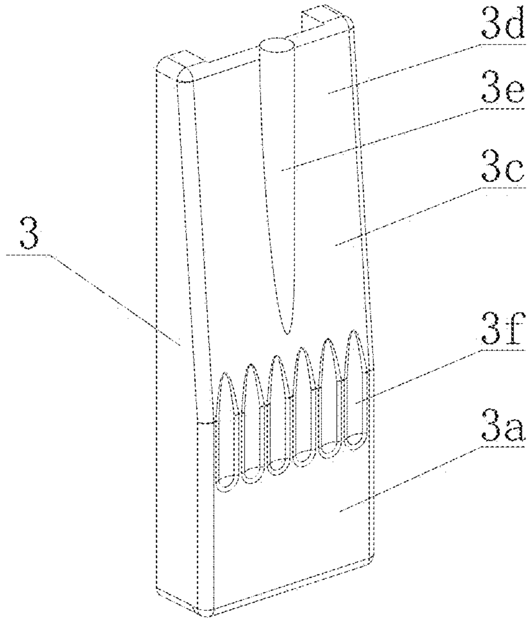
FIG. 12 is a perspective view of a guide member according to Embodiment 9 of the present disclosure.

FIG. 12 illustrates the guide member according to Embodiment 9. Columnar segment 3*a*, stroke increasing segment 3*c*, and leading-in segment 3*d* are provided. The stroke increasing segment 3*c* and the leading-in segment 3*d* are located on a same oblique surface. That is, a relatively thick portion close to the columnar segment 3*a* is the stroke increasing segment 3*c*, and a relatively thin portion close to the driving vertical rod 1*b* is the leading-in segment 3*d*. Vertical groove 3*f* is formed at a tail end of the columnar segment 3*a*. A tail end of the vertical groove 3*f* extends to an inlet end of the stroke increasing segment 3*c*. The strip ridge has a circular cross section. An axis of the ridge is parallel to a bottom edge of the guide member 3, is inserted into the oblique surface, and intersects with the oblique surface.

Figure 13:
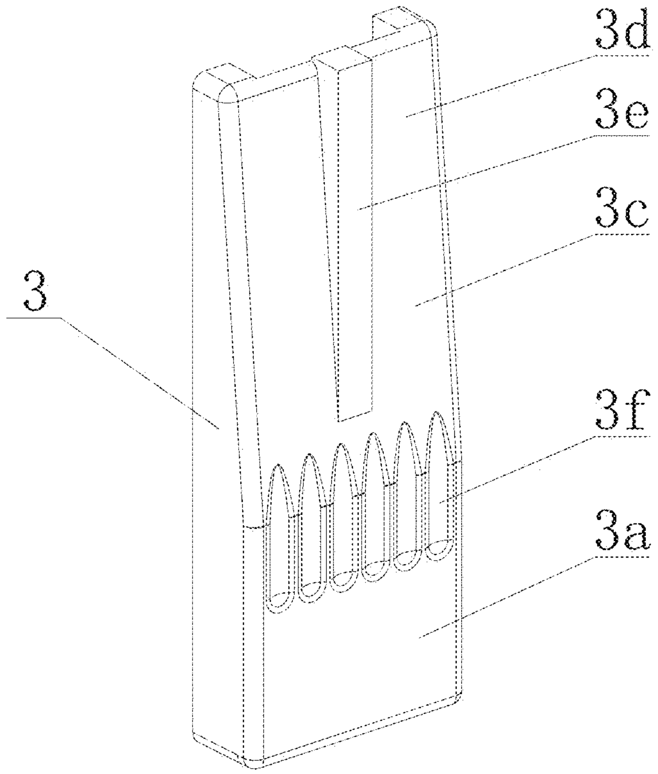
FIG. 13 is a perspective view of a guide member according to Embodiment 10 of the present disclosure.

FIG. 13 illustrates the guide member according to Embodiment 10. The strip ridge 3*e* has a square cross section. Other contents are the same as those in Embodiment 9. An axis of the ridge is parallel to a bottom edge of the guide member 3, is inserted into the oblique surface, and intersects with the oblique surface.

Figure 14:
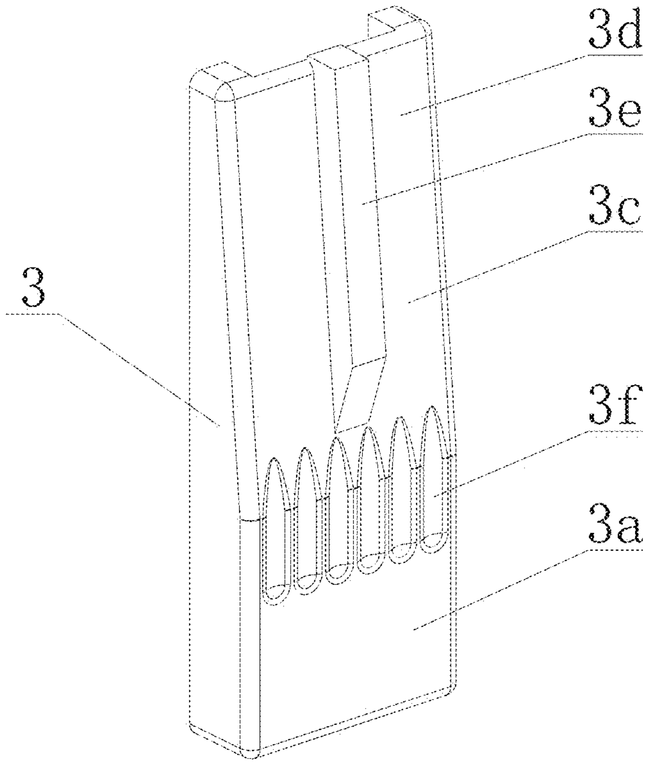
FIG. 14 is a perspective view of a guide member according to Embodiment 11 of the present disclosure.

FIG. 14 illustrates the guide member according to Embodiment 11. The strip ridge 3*e* has a square cross section. An axis of the ridge is parallel to an oblique surface of the guide member 3. The inlet end of the strip ridge 3*e* is provided with a chamfer. Other contents are the same as those in Embodiment 10.

Figure 15:
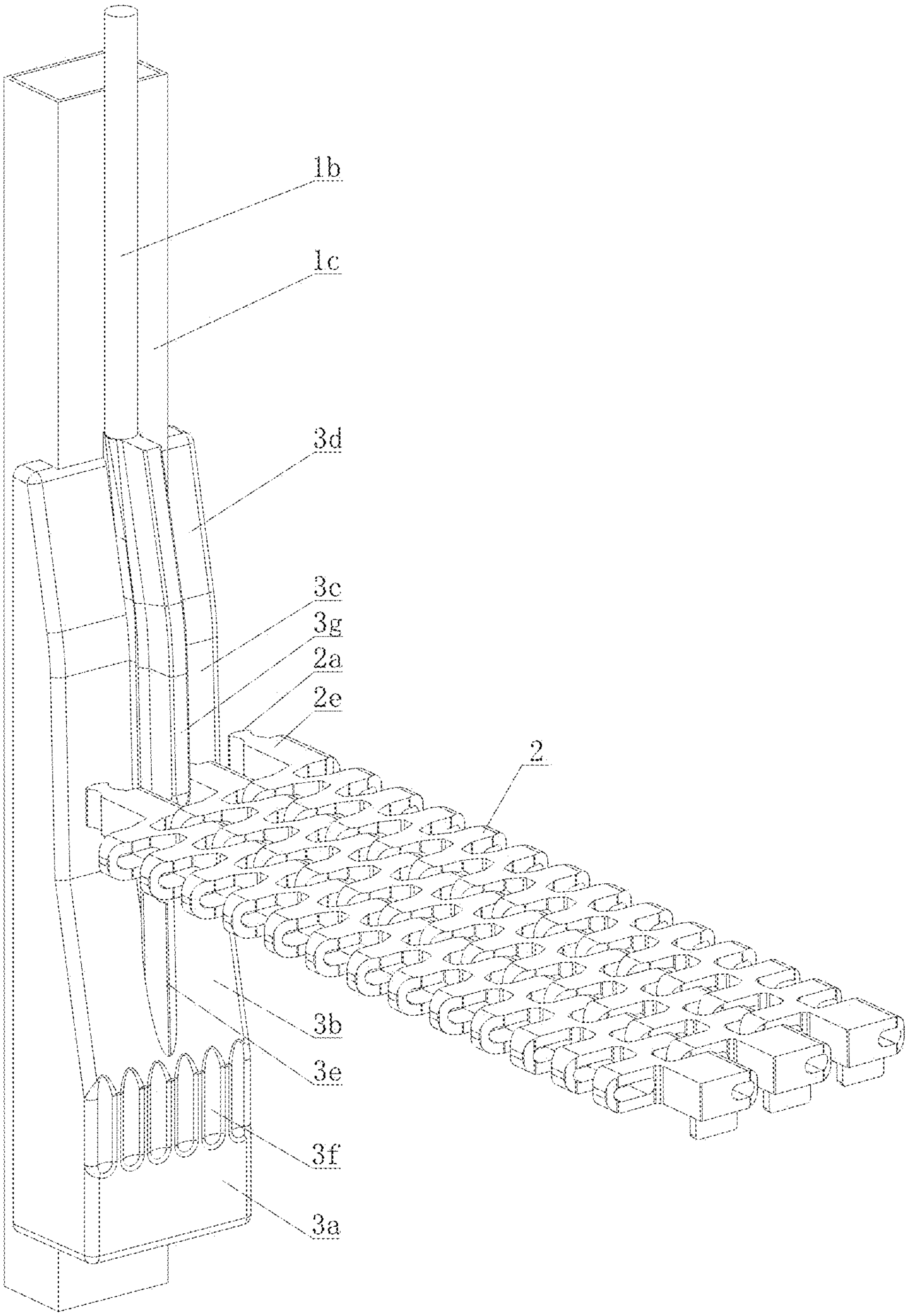
FIG. 15 is a perspective view of a guide member according to Embodiment 12 of the present disclosure.

FIG. 15 illustrates the guide member according to Embodiment 12. The inner side of each link of the mesh chain 2 is provided with link driving end 2*e* extending to the outer wall of the rotary drum. The mesh chain guiding head 2*a* is located at a head of the link driving end 2*e*. A length of the link driving end 2*e* is far greater than a length of the mesh chain guiding head 2*a*. Heightening ridge 3*g* connected to the strip ridge integrally is provided at a top of the strip ridge 3*e*. The heightening ridge 3*g* has a square cross section. When the strip ridge 3*e* is engaged with the mesh chain guiding head 2*a*, a sidewall of heightening ridge 3*g* abuts against a sidewall of the corresponding link driving end 2*e* to form engagement. An engaging concave arc is usually provided at a sidewall of the mesh chain guiding head 2*a*. The engaging sidewall of the heightening ridge 3*g* and the engaging sidewall of the link driving end 2*e* are a plane.

The mesh chain is usually a plastic part. An area of engagement between the mesh chain guiding head 2*a* and the strip ridge 3*e* is relatively small. In case of a large tensile force of the mesh chain, slip or skip still occurs possibly. After the heightening ridge 3*g* is provided, the radial engagement height of the rotary drum is greatly increased. The heightening ridge 3*g* and the link driving end 2*e* are engaged to jointly work for transmission and load bearing. This can completely prevent the skip.

Figure 16:
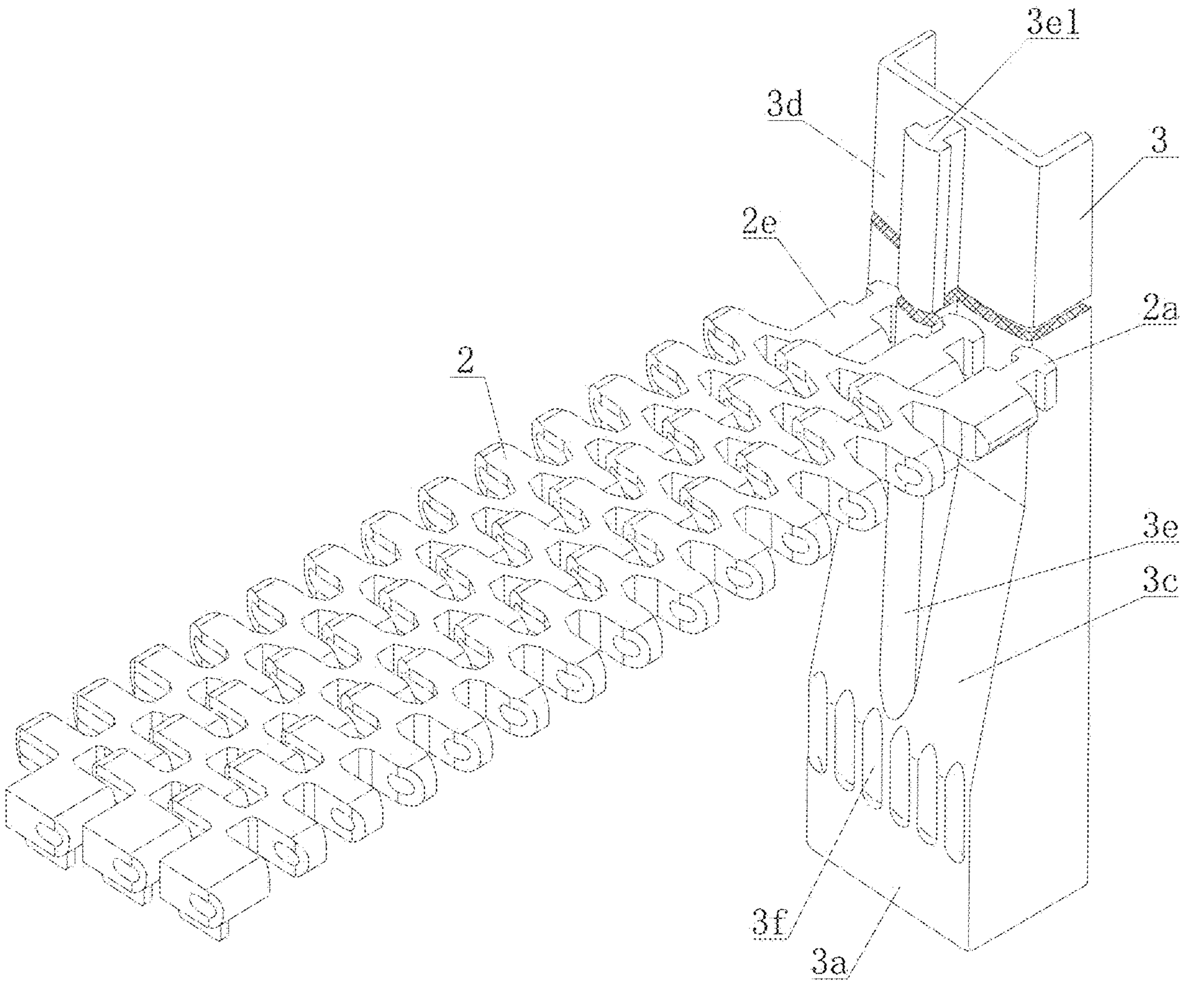
FIG. 16 is a perspective view of a guide member according to Embodiment 13 of the present disclosure.

FIG. 16 illustrates the guide member according to Embodiment 13. A cross section of the strip ridge 3*e* is a T shape that is wide outside and narrow inside. The mesh chain guiding head 2*a* matching with the strip ridge is also provided with a T-shaped head that is wide outside and narrow inside. Two T-shaped heads have opposite directions, and are hooked to each other in engagement. This can prevent the skip of the mesh chain.

The strip ridge 3*e* may also be provided with ridge overhead hook 3*e*1. The mesh chain guiding head 2*a* is provided with a mesh chain overhead hook matching with the ridge overhead hook. The mesh chain overhead hook and the ridge overhead hook 3*e*1 are hooked to each other in engagement, so as to prevent the slip or skip in case of the large load.

Figure 17:
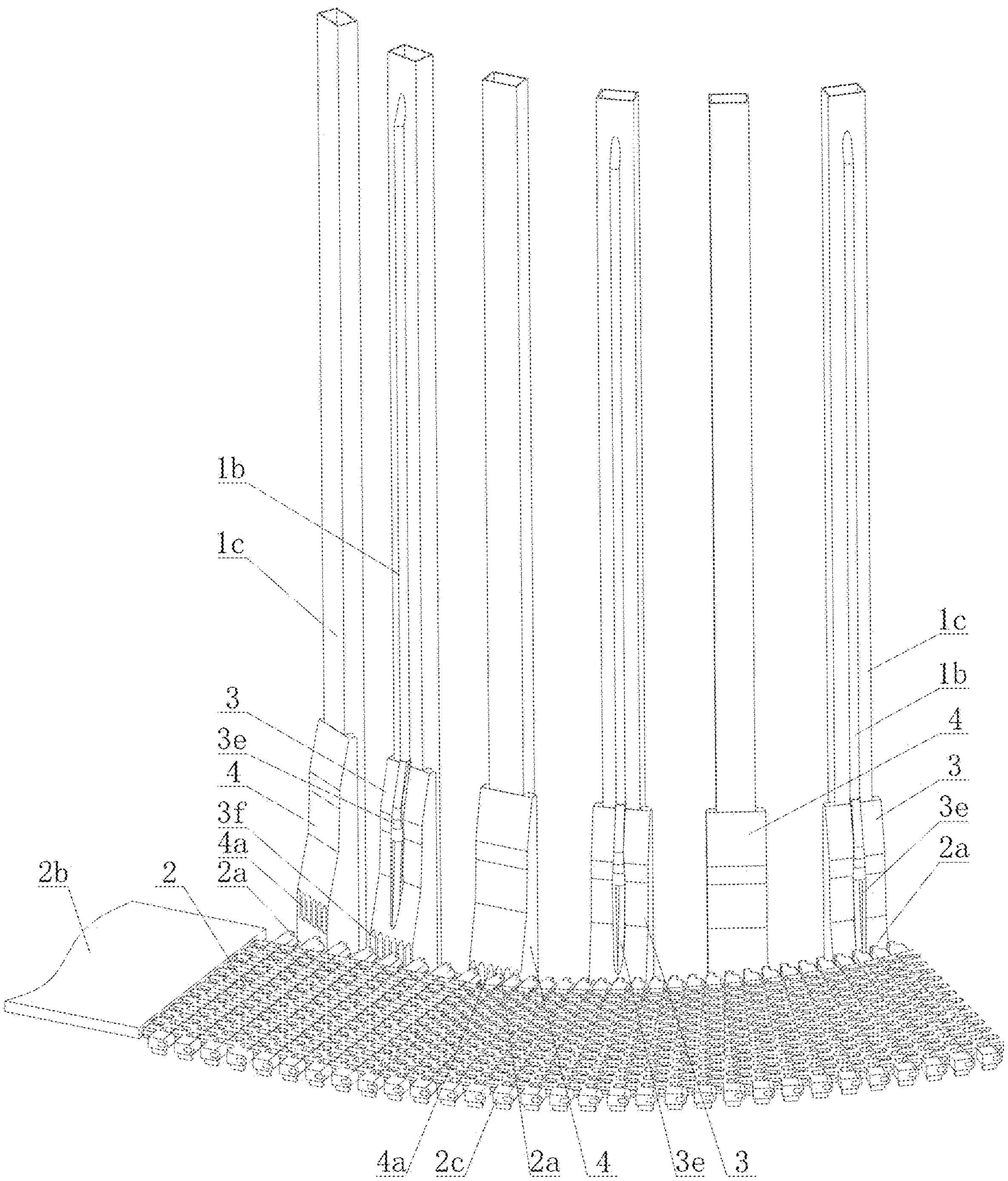
FIG. 17 illustrates a working state of a guide member according to Embodiment 14 of the present disclosure.

FIG. 17 illustrates the guide member according to Embodiment 14. The guide members 3 are spaced apart at inlet ends of the rotary drum upright posts 1*c*. For example, every two rotary drum upright posts 1*c* are provided with one guide member 3. The strip ridge 3*e* is provided on the guide member 3. Limit member 4 is provided between adjacent guide members 3. The limit member 4 and the guide member 3 are arranged alternately at the periphery of the rotary drum. A plurality of vertical grooves 4*a* for allowing the mesh chain guiding head 2*a* to be embedded into are formed in an outer wall of the limit member 4 along a width direction. The outer wall of the limit member 4 provided with the vertical groove 4*a* and the outer wall of the columnar segment 3*a* of the adjacent guide member 3 are located on a same circumference. The limit member 4 is also fixed at the inlet end of the rotary drum upright post 1*c*. The inlet end of the guide member 3 may also be provided with the vertical grooves 3*f*.

The limit member 4 may be different from the guide member 3 in shape. The guide member not provided with the strip ridge may also be used as the limit member 4, so as to save the mold and the manufacturing cost.

As shown in FIG. 17, the mesh chains on the linear segment 2*b* advance to the fan-shaped transition segment 2*c*. At a tail end of the fan-shaped transition segment 2*c*, the strip ridge 3*e* is engaged with the mesh chain guiding head 2*a*. The rotary drum 1 hooks the mesh chains 2 to enter the engagement spiral 2*d*. While the rotary drum rotates, the mesh chains wind up. On the fan-shaped transition segment 2*c*, a plurality of mesh chain guiding heads 2*a* are embedded into the vertical grooves 4*a* of the limit member 4 and the vertical grooves 3*f* of the guide member 3, and are hooked, thereby jointly coping with the tensile force of the linear segment 2*b*, preventing the links on the fan-shaped transition segment 2*c* from moving back, and preventing the mesh chains 2 on the rotary drum 1 from being tensed.

Figure 18:
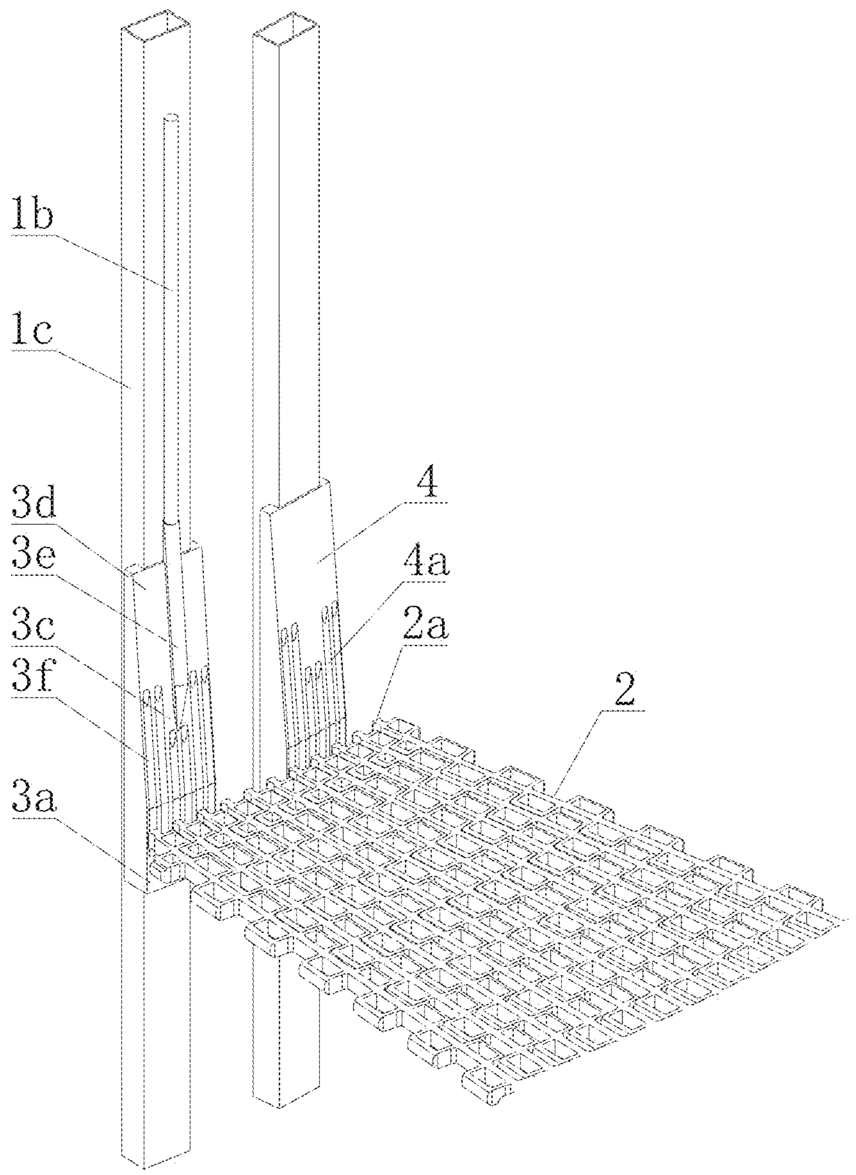
FIG. 18 illustrates a working state of a guide member according to Embodiment 15 of the present disclosure.

FIG. 18 illustrates the guide member according to Embodiment 15. The strip ridge 3*e* extends to a middle of the stroke increasing segment 3*c* from the leading-in segment 3*d*. A plurality of vertical grooves 3*f* for allowing the mesh chain guiding head 2*a* to be embedded into are formed in an outer wall of an inlet end of the guide member 3 along a width direction. The vertical groove 3*f* in the middle of the guide member extends to an inlet end of the strip ridge 3*e*, namely the vertical groove is docked with the strip ridge 3*e*. The vertical grooves 3*f* at two sides of the guide member exceed the inlet end of the strip ridge 3*e*.

When the mesh chain guiding heads 2*a* move up along the stroke increasing segment 3*c* with the vertical grooves 3*f*, a radial diameter of the rotary drum is reduced, such that the outer sides of the mesh chains move back, and the front mesh chains in an advancement direction of the guide member 3 get close to the guide member 3. Hence, looseness between the inner sides of the mesh chains in the advancement direction of the guide member 3 is eliminated. After the looseness is eliminated, the mesh chain guiding heads 2*a* at the inner sides of the mesh chains are slid out of the vertical grooves 3*f* to move back with the outer sides of the mesh chains. After reaching a height of the strip ridge 3*e*, the mesh chain guiding heads are stopped by the strip ridge 3*e*, and move up continuously along the strip ridge 3*e*. After the limited mesh chains reach a periphery of the rotary drum having a smaller diameter, the outer sides of the mesh chains are loosened.

When the mesh chain is overloaded, the mesh chain guiding head 2*a* is popped out from the original engaged vertical groove and slides into the downstream vertical groove. The strip ridge 3*e* starts from a middle of an oblique surface of the stroke increasing segment 3*c*. An excessive increased stroke at a lower portion of the stroke increasing oblique surface may be eliminated by slip of the mesh chain guiding head 2*a*, such that the increased stroke generated by the subsequent strip ridge 3*e* is more appropriate.

Figure 19:
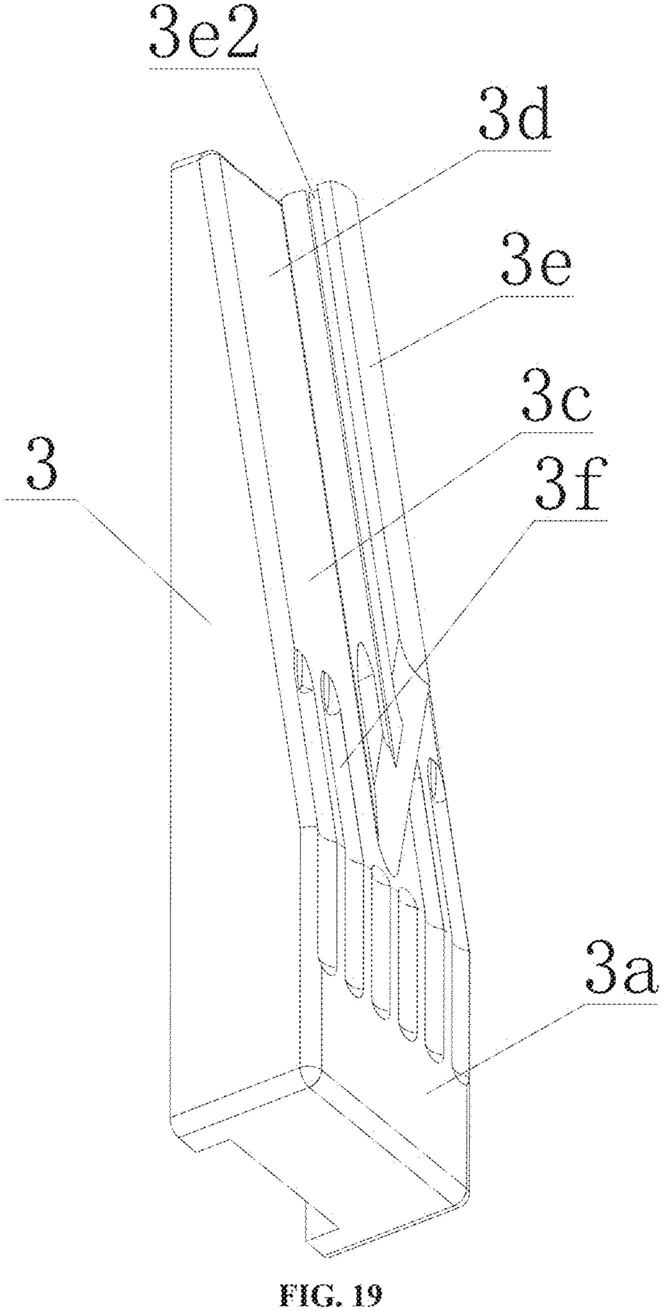
FIG. 19 is a perspective view of a guide member according to Embodiment 16 of the present disclosure.

FIG. 19 illustrates the guide member according to Embodiment 16. Buckling groove 3*e*2 is formed in a sidewall of the strip ridge 3*e*. A mesh chain buckling groove is formed in a sidewall of the corresponding mesh chain guiding head 2*a*. The ridge buckling groove and the mesh chain buckling groove 3*e*2 are embedded into each other. A top of the strip ridge 3*e* is convex arc-shaped, so as to facilitate smooth transition in engagement.

A ridge chamfer with an upper portion inclining backward is provided at an inlet end of the strip ridge 3*e*. A surface of the ridge chamfer contacting the mesh chain guiding head 2*a* is arc-shaped. The mesh chain guiding head 2*a* abuts against an arc-shaped surface of the ridge chamfer for sliding, and is engaged gradually.

Figure 20:
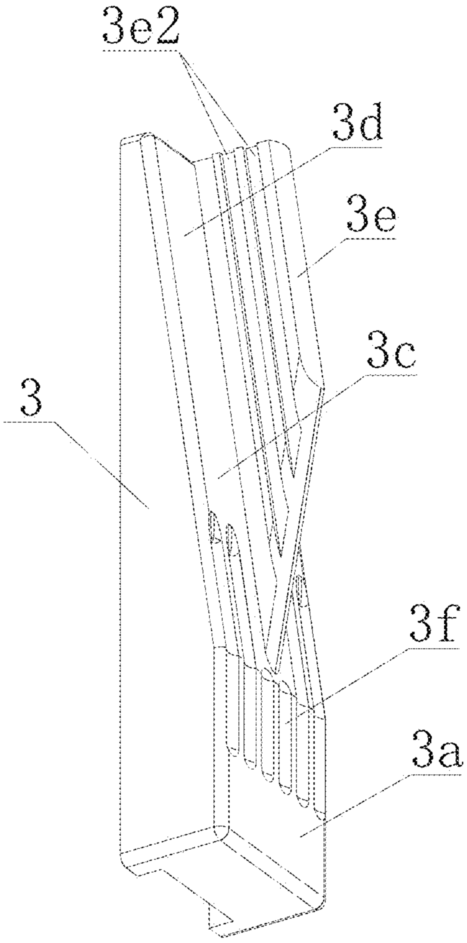
FIG. 20 is a perspective view of a guide member according to Embodiment 17 of the present disclosure.
Figure 21:
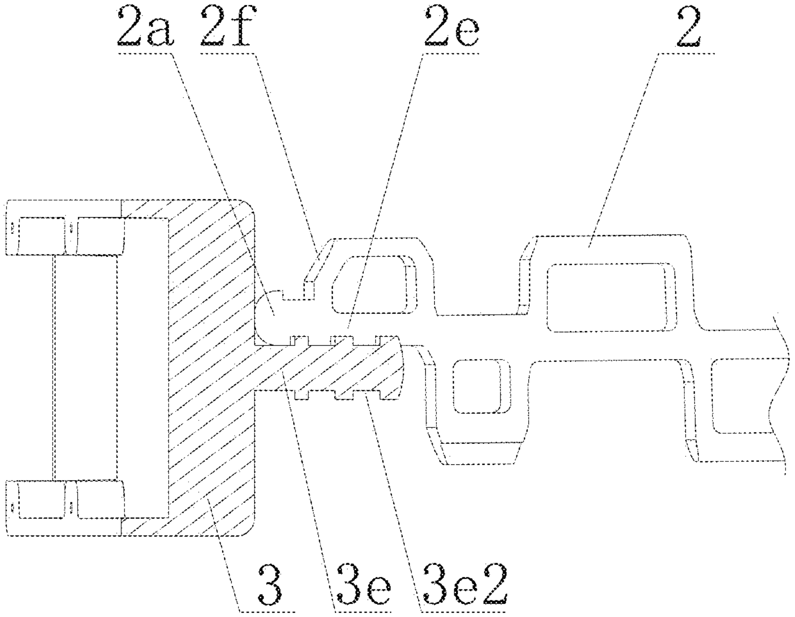
FIG. 21 illustrates an engaged state between a guide member and a mesh chain according to Embodiment 17 of the present disclosure.

FIG. 20 and FIG. 21 illustrate the guide member according to Embodiment 17. More or more buckling grooves 3*e*2 is formed in the sidewall of the strip ridge 3*e*. Corresponding mesh chain buckling grooves are formed in the sidewall of the corresponding mesh chain guiding head 2*a*. The ridge buckling groove and the mesh chain buckling groove 3*e*2 are embedded into each other. A top of the strip ridge 3*e* is convex arc-shaped. A head of the mesh chain guiding head 2*a* is also convex arc-shaped. This facilitates the mesh chain guiding head 2*a* to slide from the top of the strip ridge 3*e*, and engage with the strip ridge 3*e*.

Mesh chain chamfer 2*f* is provided on a mesh chain engaging tooth close to the mesh chain guiding head 2*a*. The mesh chain chamfer 2*f* can be slid quickly when contacting the convex arc-shaped top of the strip ridge 3*e* to prevent the clamping stagnation.

The ridge buckling groove 3*e*2 or the mesh chain buckling groove may be a rectangle, a triangle, a trapezoid, a semicircle, or other shapes embedded into each other.

The above described are merely preferred possible embodiments of the present disclosure, and should not be construed as a limitation to the protection scope of the present disclosure. The disclosure may have other implementations in addition to those described above. All technical solutions formed by equivalent replacements or equivalent transformations should fall within the protection scope of the present disclosure. The technical features that are not described herein can be implemented by or using the existing technology, and will not be repeated herein.

The invention claimed is:

1. A spiral mesh chain conveyor, comprising a rotary drum and mesh chains, wherein the mesh chains enter a periphery of the rotary drum along a linear segment and extend along a spiral line in a winding manner;

a plurality of driving vertical rods are uniformly arranged at the periphery of the rotary drum;

an inner side of each link of the mesh chain adjacent to the rotary drum is provided with a mesh chain guiding head engaged with the driving vertical rod;

an inlet end of the driving vertical rod is provided with a guide member;

a stroke-increasing segment and a leading-in segment are sequentially provided on an outer wall of the guide member;

a tail end of the leading-in segment inclines to an outer wall of the rotary drum;

the guide member is provided with a strip ridge along an outer wall of the stroke-increasing segment and an outer wall of the leading-in segment;

a tail end of the strip ridge is docked with the inlet end of the driving vertical rod; and when a front mesh chain guiding head is engaged with the strip ridge, a rear mesh chain guiding head is limited on the outer wall of the rotary drum and bears a tensile force of the linear segment at a rear of the rear mesh chain guiding head, wherein a plurality of vertical grooves for allowing the mesh chain guiding head to be embedded into are formed in an outer wall of an inlet end of the guide member along a width direction.

2. The spiral mesh chain conveyor according to claim 1, wherein a tail end of the vertical groove and an inlet end of the strip ridge are spaced apart by a distance or flush with each other, or the tail end of the vertical groove extends into the outer wall of the stroke-increasing segment.

3. The spiral mesh chain conveyor according to claim 1, wherein an inlet end of the guide member is further provided with a columnar segment; and the plurality of vertical grooves is located on an outer wall of the columnar segment.

4. The spiral mesh chain conveyor according to claim 3, wherein an inlet oblique segment is provided between the columnar segment and the stroke-increasing segment; and an inlet end of the strip ridge extends to a slope of the inlet oblique segment and intersects with the slope of the inlet oblique segment.

5. The spiral mesh chain conveyor according to claim 3, wherein the stroke-increasing segment and the leading-in segment are located on an identical oblique surface or on two oblique surfaces having different inclinations; and a length direction of the strip ridge is parallel to an oblique surface where the strip ridge is located or parallel to a bottom edge of the guide member.

6. The spiral mesh chain conveyor according to claim 1, wherein the strip ridge has a circular cross section; a bottom of the circular cross section is connected to the guide member integrally; and a concave arc of an engaging surface of the mesh chain guiding head is hooked to a convex arc of a side of the strip ridge.

7. The spiral mesh chain conveyor according to claim 1, wherein a ridge overhead hook is provided on a sidewall of the strip ridge; a mesh chain overhead hook is provided on a sidewall of the mesh chain guiding head; and the mesh chain overhead hook and the ridge overhead hook are embedded into each other.

8. The spiral mesh chain conveyor according to claim 1, wherein a cross section of the strip ridge is a square or a T shape being wide outside and narrow inside.

9. The spiral mesh chain conveyor according to claim 1, wherein at least one ridge buckling groove is formed in a sidewall of the strip ridge; at least one mesh chain buckling groove is formed in a sidewall of the mesh chain guiding head; and the ridge buckling groove and the mesh chain buckling groove are embedded into each other.

10. The spiral mesh chain conveyor according to claim 9, wherein the ridge buckling groove or the mesh chain buckling groove is a rectangle, a triangle, a trapezoid, or a semicircle.

11. The spiral mesh chain conveyor according to claim 1, wherein the strip ridge extends to a middle of the stroke-increasing segment from the leading-in segment; a plurality of vertical grooves for allowing the mesh chain guiding head to be embedded into are formed in an outer wall of an inlet end of the guide member along a width direction; and the vertical groove extends to an inlet end of the strip ridge or exceeds the inlet end of the strip ridge.

12. The spiral mesh chain conveyor according to claim 11, wherein when the mesh chain is overloaded, the mesh chain guiding head is popped out from an original engaged vertical groove and slides into a downstream vertical groove.

13. The spiral mesh chain conveyor according to claim 1, wherein a top of the strip ridge is convex arc-shaped; an inclined ridge chamfer is provided at an inlet end of the strip ridge; and a surface of the inclined ridge chamfer contacting the mesh chain guiding head is arc-shaped.

14. The spiral mesh chain conveyor according to claim 1, wherein a mesh chain chamfer is provided on a mesh chain engaging tooth adjacent to the mesh chain guiding head.

15. The spiral mesh chain conveyor according to claim 1, wherein limit members are uniformly arranged on a circumference of an inlet end of the rotary drum; a plurality of vertical grooves for allowing the mesh chain guiding head to be embedded into are formed in an outer wall of the limit member along a width direction; and the limit member and the guide member are arranged alternately at the periphery of the rotary drum.

16. The spiral mesh chain conveyor according to claim 1, wherein the plurality of vertical grooves is a concave arc-shaped groove, a V-shaped groove, a trapezoidal groove, or a square groove.

17. The spiral mesh chain conveyor according to claim 1, wherein the inner side of each link of the mesh chain is provided with a link driving end extending to the outer wall of the rotary drum; the mesh chain guiding head is located at a head of the link driving end; a heightening ridge connected to the strip ridge integrally is provided at a top of the strip ridge; and when the strip ridge is engaged with the mesh chain guiding head, the heightening ridge on the strip ridge is further engaged with the corresponding link driving end.

18. The spiral mesh chain conveyor according to claim 1, wherein there is an arc length difference L between an arc length of a spiral line wound by an inner side of the mesh chain on the stroke-increasing segment and the leading-in segment, and an arc length of a spiral line wound by the inner side of the mesh chain along the driving vertical rod at an identical phase angle;

a distance between an engaging surface of the mesh chain guiding head at an inlet of the stroke-increasing segment and an engaging surface of the driving vertical rod in a circumferential direction of the rotary drum is defined as an engagement clearance D1;

after engaged with the mesh chain guiding head, the driving vertical rod drives the inner side of the mesh chain to advance a distance to overcome a loosened clearance D2, an outer side of the mesh chain is driven to advance; and the arc length difference L≥the engagement clearance D1+the loosened clearance D2.

19. The spiral mesh chain conveyor according to claim 15, wherein the vertical groove is a concave arc-shaped groove, a V-shaped groove, a trapezoidal groove, or a square groove.

* * * * *